(12) United States Patent
Meadowcroft et al.

(10) Patent No.: US 7,435,015 B2
(45) Date of Patent: Oct. 14, 2008

(54) KEYED TRANSCEIVER MODULE

(75) Inventors: David Meadowcroft, Stowmarket (GB);
David Parkinson, Stowmarket (GB);
Ian Mitchell, Ipswich (GB)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 86 days.

(21) Appl. No.: 11/346,218

(22) Filed: Feb. 3, 2006

(65) Prior Publication Data

US 2006/0274509 A1 Dec. 7, 2006

(51) Int. Cl.
*G02B 6/36* (2006.01)
*H04B 10/00* (2006.01)

(52) U.S. Cl. ............................. 385/92; 385/88; 385/89; 385/76; 385/77; 385/53; 398/135; 398/139

(58) Field of Classification Search .................. 385/53, 385/76, 77, 78, 88, 89, 92, 93, 94, 139; 398/135, 398/138, 139

See application file for complete search history.

(56) References Cited

U.S. PATENT DOCUMENTS

| | | | | |
|---|---|---|---|---|
| 4,979,792 A | * | 12/1990 | Weber et al. | 385/53 |
| 5,016,968 A | * | 5/1991 | Hammond et al. | 385/78 |
| 5,028,110 A | * | 7/1991 | Plummer | 385/42 |
| 5,212,752 A | * | 5/1993 | Stephenson et al. | 385/78 |
| 5,265,181 A | * | 11/1993 | Chang | 385/75 |
| 5,289,554 A | * | 2/1994 | Cubukciyan et al. | 385/76 |
| 5,325,454 A | * | 6/1994 | Rittle et al. | 385/76 |
| 5,359,686 A | * | 10/1994 | Galloway et al. | 385/49 |
| 5,733,149 A | | 3/1998 | Groves et al. | 439/680 |
| 7,154,752 B2 | | 12/2006 | Sato et al. | |

FOREIGN PATENT DOCUMENTS

GB 2376348 1/2002

* cited by examiner

*Primary Examiner*—Brian M Healy

(57) ABSTRACT

An optical module and chassis incorporating "keying" features that ensure the correct insertion of the module into a given chassis, thereby preventing damage to the module and/or the system to which the chassis is connected.

20 Claims, 11 Drawing Sheets

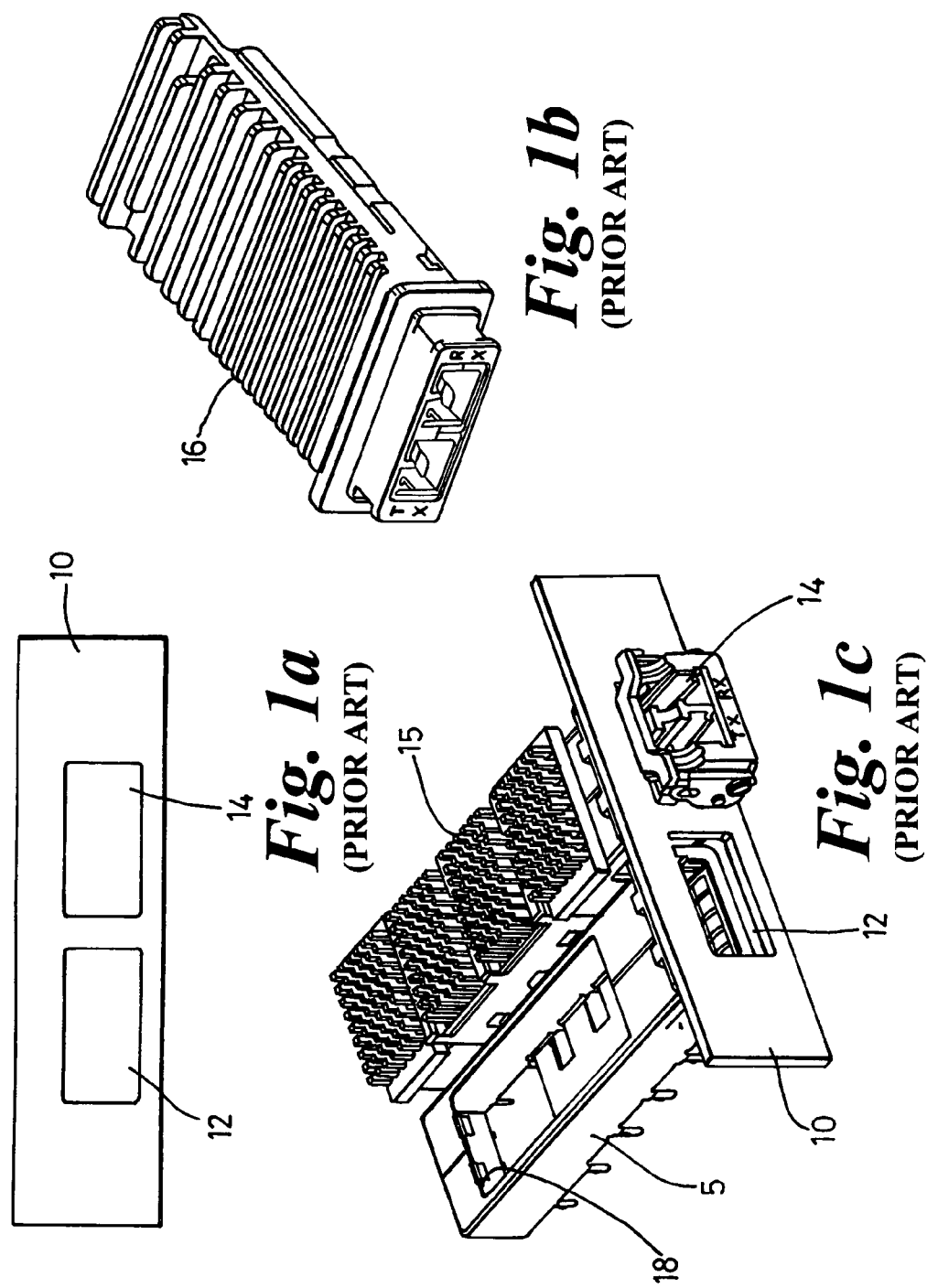

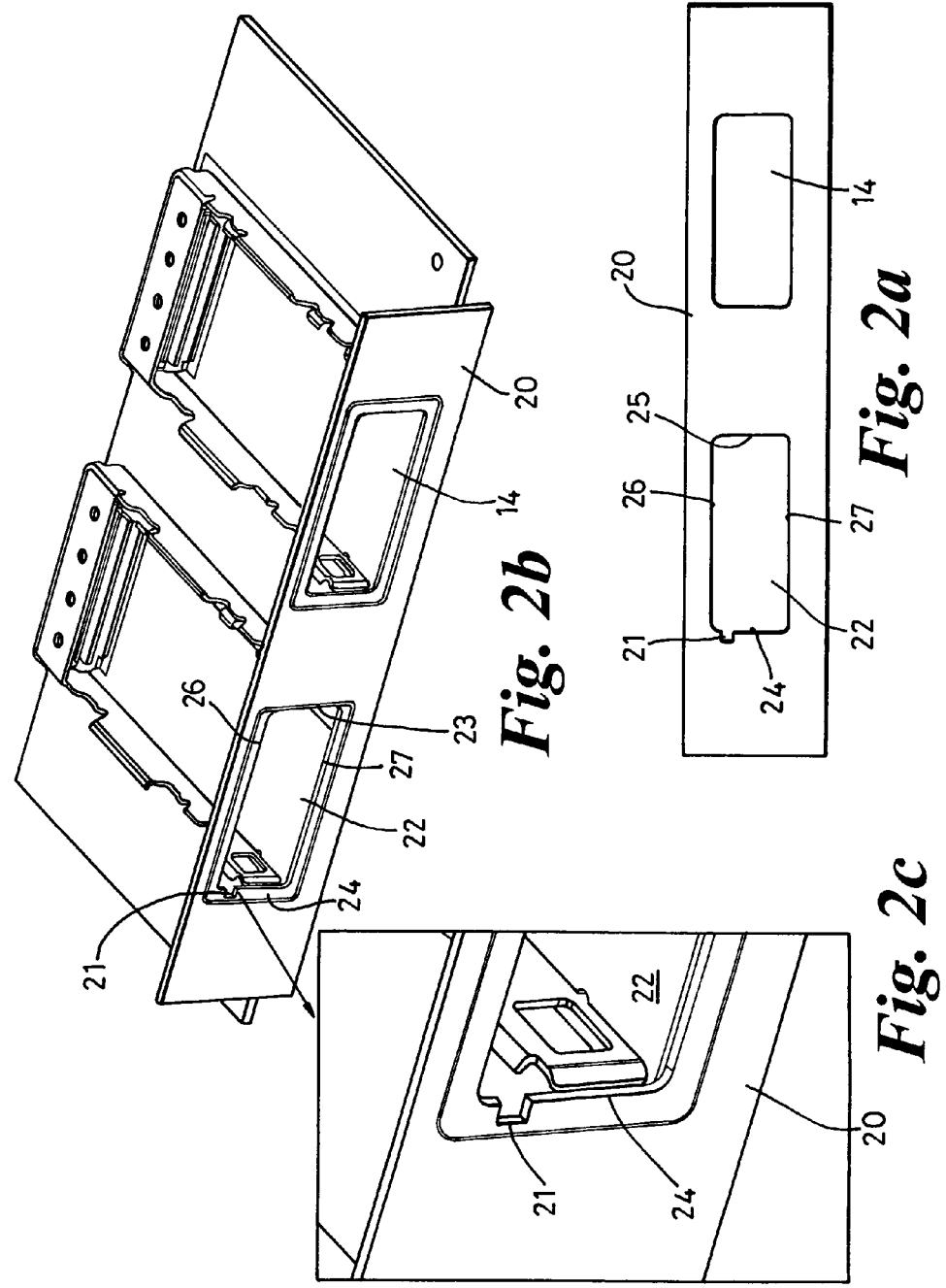

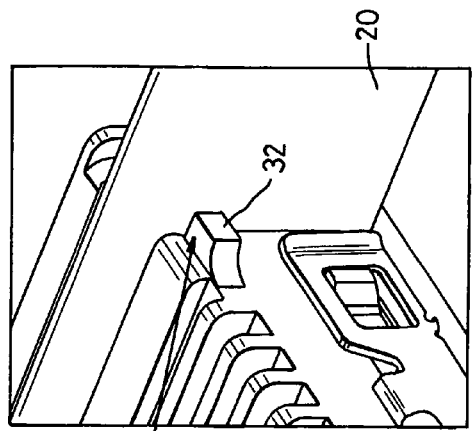
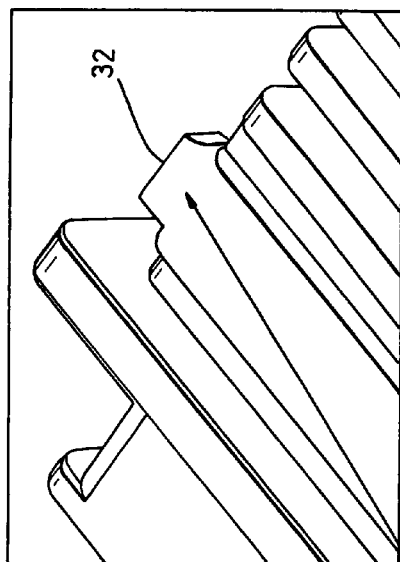
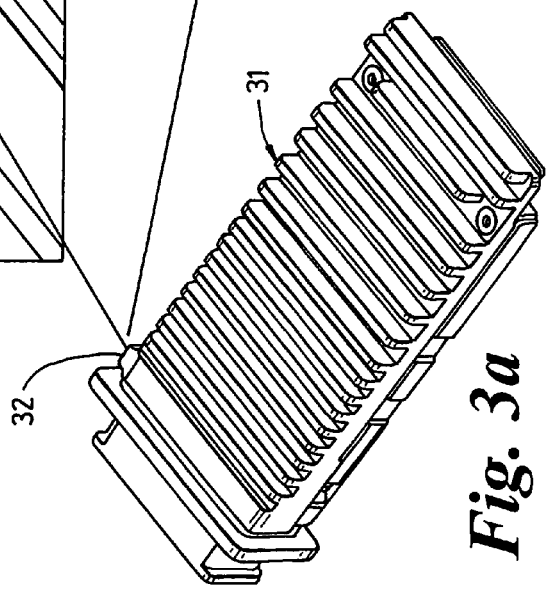

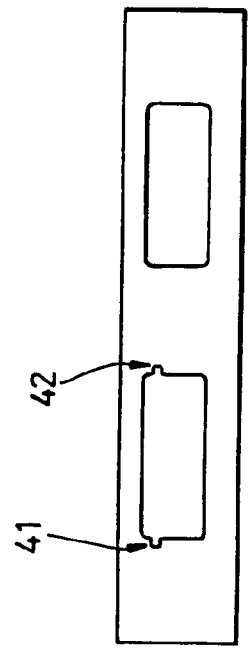
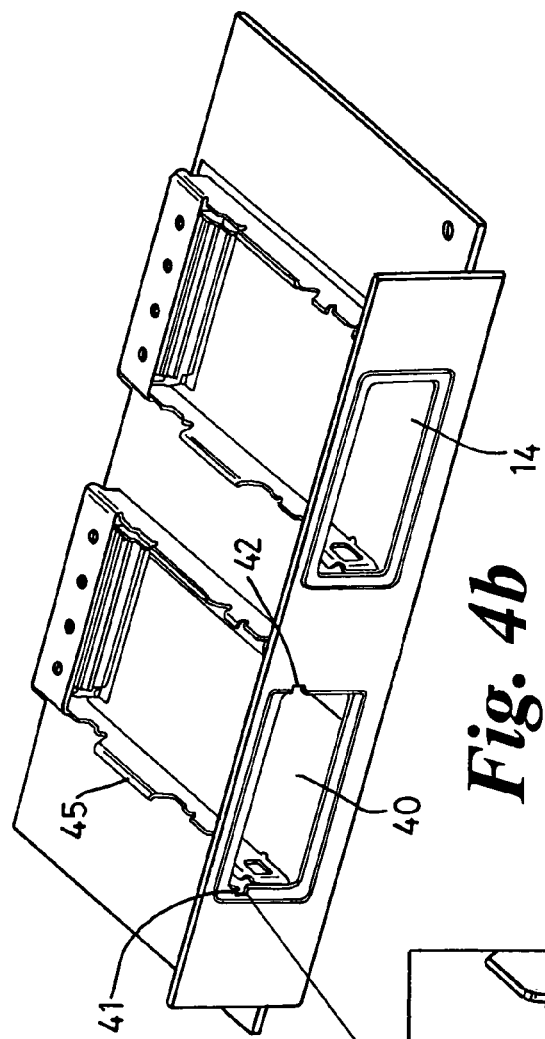
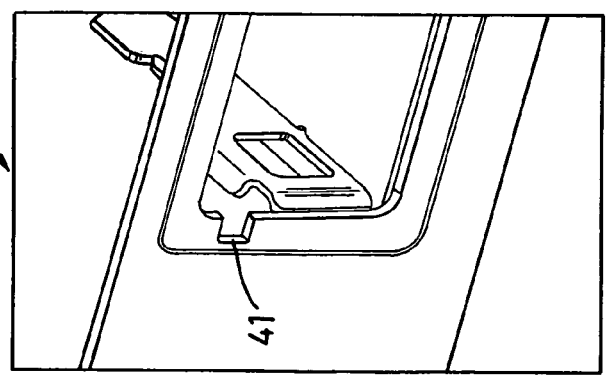

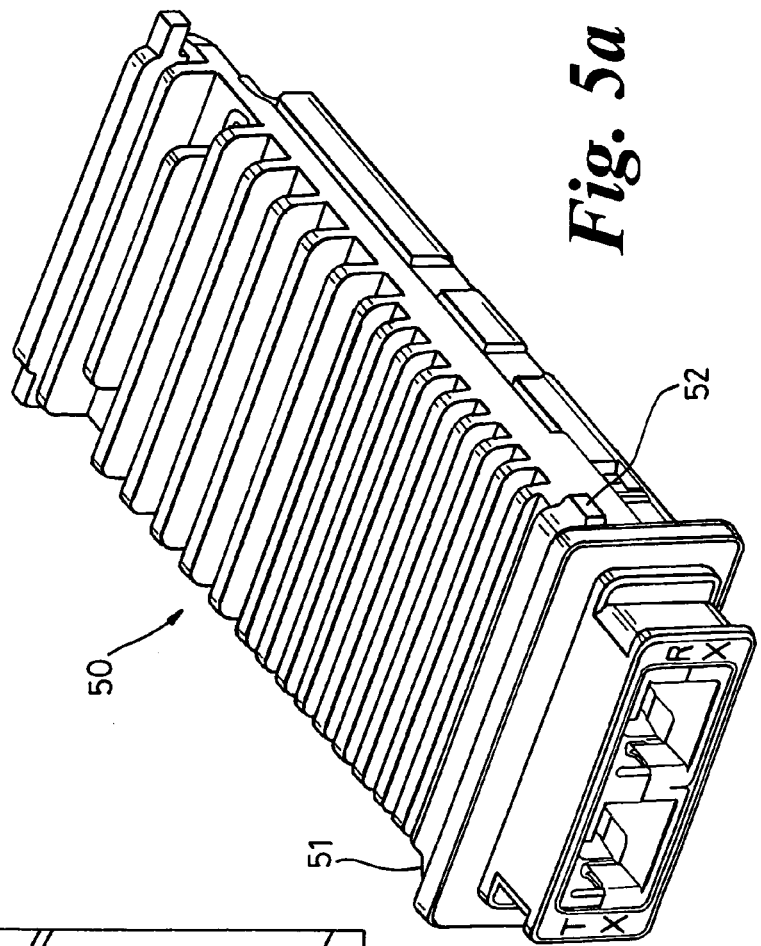
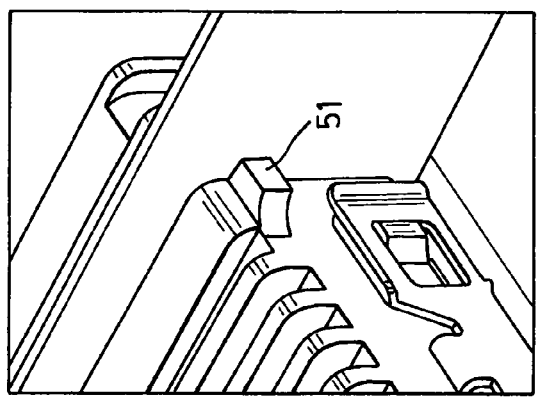
Fig. 5a
Fig. 5b

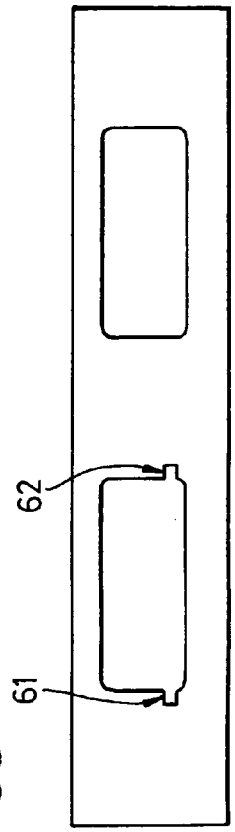
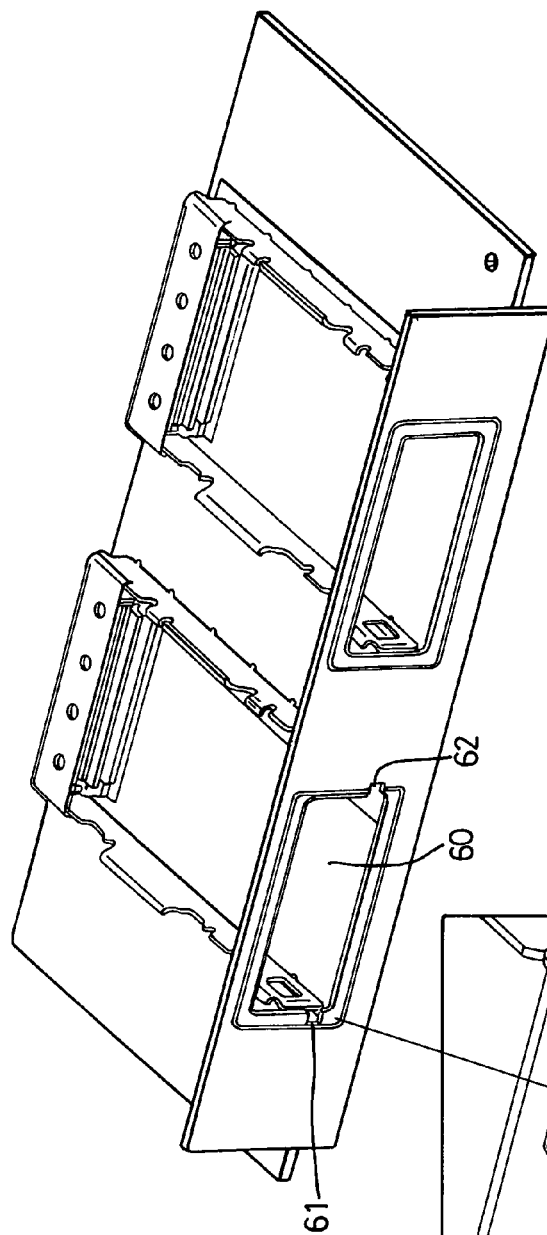
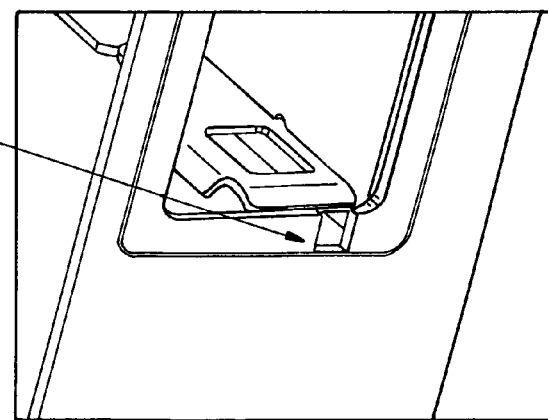

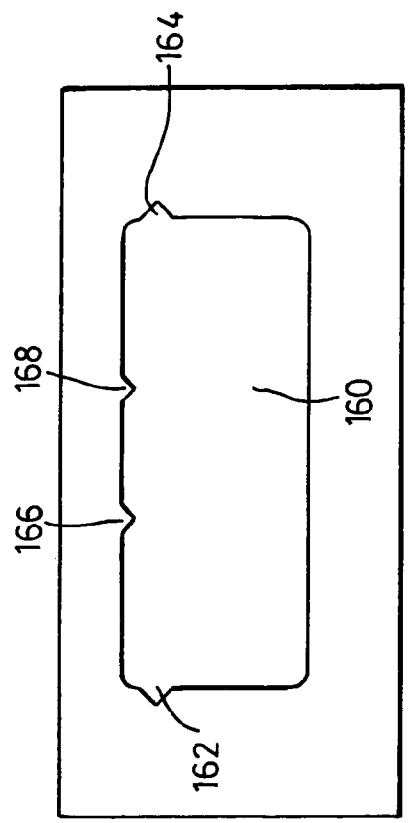
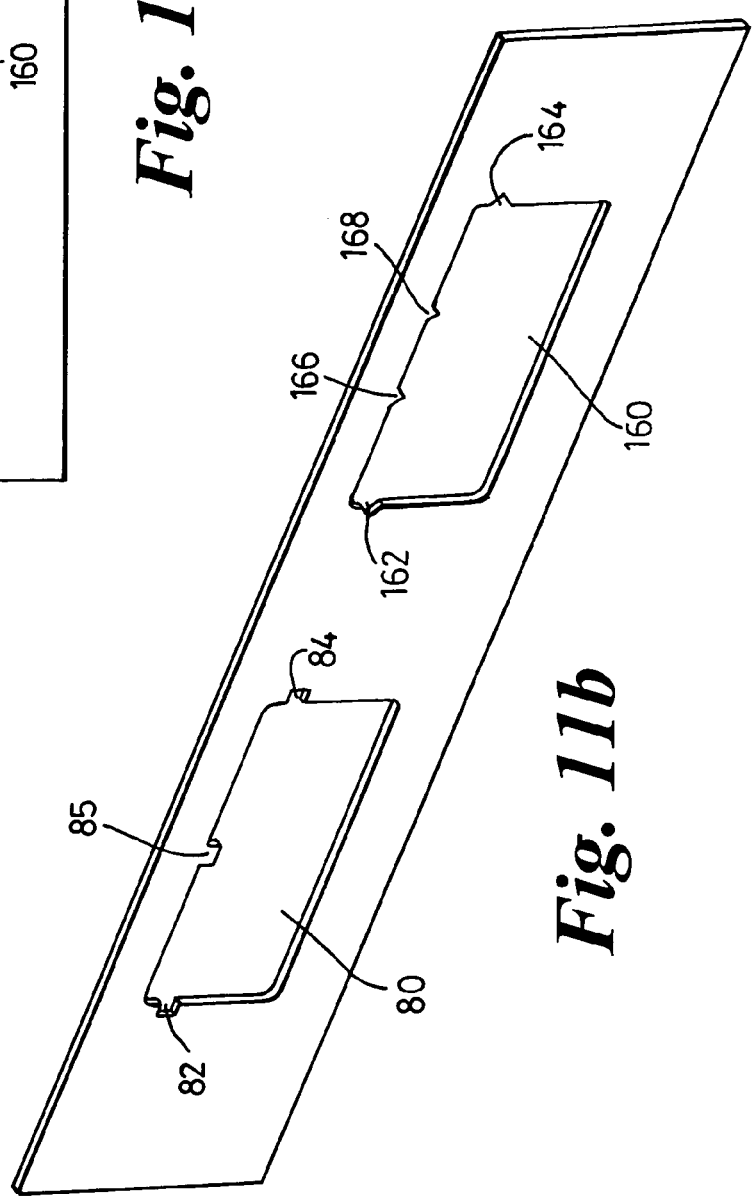
Fig. 11a
Fig. 11b

KEYED TRANSCEIVER MODULE

RELATED APPLICATIONS

The present application is based on, and claims priority to British Application Serial Number 0502706.5, filed Feb. 10, 2005, the disclosure of which is hereby incorporated by reference herein in its entirety.

1. Field of the Invention

The present invention relates to an improved transceiver module, which incorporates a "key" feature that acts to ensure the correct insertion of a module into a given chassis. Furthermore, the present invention relates to a chassis having a feature that receives the "key" feature of the module, thereby preventing damage to both the module and or the system to which the chassis is connected.

2. Background Art

Currently there is a range of different types of optical transceiver module available on the market, each being built according to different standards set by the various standard setting committees such as the IEEE. These specifications are often defined by multi-source agreements (MSA), which dictate the form, fit and function of both the transceiver module and the chassis into which they are inserted. Xenpak, X2, and XFP are examples of just a few of the standards covered under by multi-source agreements.

Furthermore, within each standard there may exist variations. For example within the XFP standard such variations include a the QXFP transceiver module that has the same mechanical footprint as an XFP transceiver and hence could be inserted into a regular XFP slot, but has a different electrical connector at the end of the module. Thus if the QXFP module was inserted into an XFP chassis it would cause an electrical short circuit in both the transceiver and chassis potentially damaging both.

Another example is that within each MSA module vendors can produce modules which operate at different wavelengths (i.e. 1310 nm or 1550 nm) and which have different optical output powers. All these modules will physically able to be plugged into any MSA compliant chassis but they may not work correctly due to the different wavelengths or output powers.

The existence of different standards as well as variations within standards presents a technical problem in trying ensuring that an optical transceiver module built to comply with a specific standard is inserted into the correct chassis. In addition, there is a need to ensure that a given module is inserted correctly within a given chassis. For example it is not uncommon for the user installing the transceiver module to inadvertently install the transceiver upside down. Both of the above scenarios can cause damage to the transceiver, chassis, or the system into which it has been inserted. Similarly, a module inserted into an incorrect chassis slot may cause the user to think that the module is faulty or operating incorrectly thus causing damage to the manufacturer's reputation.

Current solutions to the above problem rely on the technician or person installing the transceiver to ensure that the correct transceiver module is inserted into the correct chassis slot. Since many openings in chassis are similar in both shape and size this poses a problem for the person inserting the module. Attempts have been made to colour code or label modules to prevent incorrect insertion, however these solutions are not foolproof.

Thus it is an object of the present invention to overcome the above-mentioned technical problem by providing a module and chassis, which are keyed in such a way that the incorrect insertion of a module is no longer possible.

SUMMARY OF THE INVENTION

According to one aspect of the invention, an optical module includes a rectangular housing with a keying feature on its outer surface.

Another aspect of the invention relates to a chassis arranged to receive an optical module through an opening in a front plate of said chassis, wherein the opening has at least one keying feature disposed therein.

By providing a module and chassis with keyed features it is possible to ensure that the correct module is always inserted into a chassis slot for which it has been designed. This is achieved independently of the user's knowledge of the module and or system and advantageously prevents damage to both the module and system. Advantageously, the present invention maintains both thermal and EMI shielding properties of the current module/chassis arrangements. Finally the module/chassis arrangement of the present invention is simple, reliable and inexpensive to implement.

BRIEF DESCRIPTION OF THE DRAWINGS

While the principal features and advantages of the present invention have been described above, a more detailed description of the prior art and the invention are be given below with reference to the following drawings where:

FIGS. 1a-c are illustrations of a typical known chassis and module arrangement,

FIGS. 2a-c and 3a-c are illustrations of a first embodiment of the present invention in which the opening and module have a single keying feature, FIGS. 4a-c and 5a-b are illustrations of a second embodiment of the present invention in which the opening and module have two keying features, FIGS. 6a-c and 7a-b are illustrations of a third embodiment of the present invention, FIGS. 11a-b are illustrations of a variation of the embodiment shown in FIG. 8.

DETAILED DESCRIPTION OF THE DRAWINGS

Figure 7A:
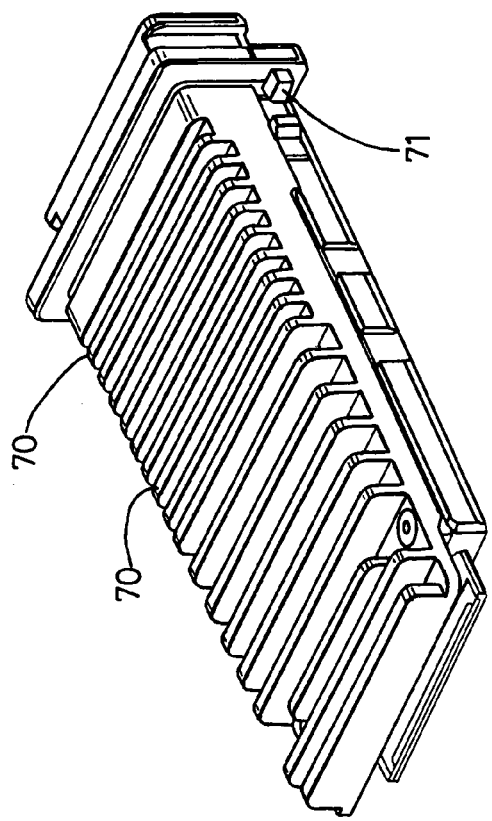
Figure 7B:
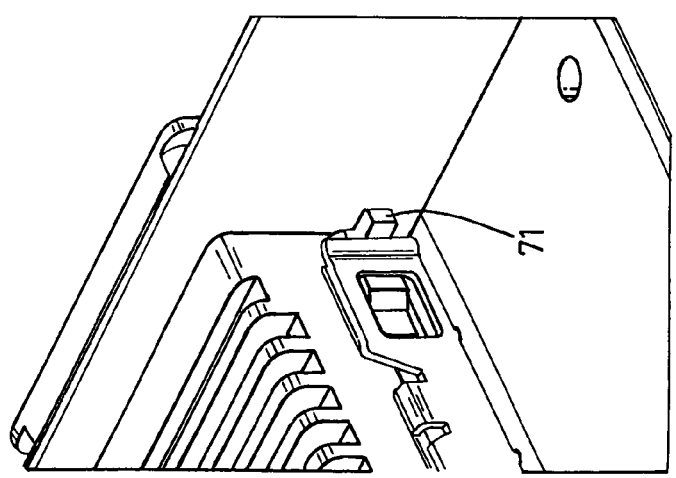

In FIGS. 1a-c a known arrangement of an optical transceiver module such as an XFP 15 and X2 16 modules along with the XFP and chassis is shown. The standard or front plate 10 of the chassis 5 has two rectangular shaped openings 12 and 14, which allow any appropriately sized module 15 to be inserted. As previously discussed this design allows for the possibility of an incorrectly configured module being inserted through the opening and into a chassis for which the module has not been configured. Also it is possible with the current design to insert the module upside down. Both of these scenarios can result in damage to the module and the chassis as well as faulty operation of the system. Furthermore, if the module is inserted upside down electrical contacts (not shown) located at the rear end of the module, which are meant to make electrical contact with connector 18 located at the rear of the chassis can be damaged.

FIGS. 2a-c show a first embodiment of the present invention in which 20 has a keying feature 21 disposed along the left hand perimeter of opening 22. For comparison sake a standard opening 14 is shown next to the opening 14 according to the present invention. Here the keying feature 21 located in the opening takes the form of a small slot cut out of the upper portion of the left side 24 of the perimeter. As will be appreciated the location and size of this keying feature can be varied. For example, it may be located on the right hand side 25 or alternatively on the upper 26 or lower 27 perimeters or any combination of the above.

Now as seen in FIGS. 3*a-c* module 31 has a keying feature 32 located along its outer surface such that when the module is inserted through opening 22 the keying feature of the module fits into keying feature 21 of the opening. Here the keying feature 32 of the module takes the form of an appropriately sized protrusion extend outwardly from the side of the module. The size and shape of this protrusion should match the size and shape of the slot in the corresponding opening. The protrusions can be made of plastic or other suitable material. Thus the object of the present invention is achieved in that this module 31 can only be inserted into a having the correspondingly shaped and appropriately located slot. Not only does this arrangement insure that the right module is inserted but also that it is inserted in the correct orientation. As will be appreciated, modules and chassis of a given standard can be keyed individually so that modules of different standard cannot be inserted.

FIGS. 4*a-c* show an alternative embodiment of the present invention in which two keying features 41 and 42 are located on opposite sides of the bezel opening 40. In this embodiment the keyed feature 41 and 42 are located towards the top of the bezel opening. Similarly as seen in FIGS. 5*a-b* module 50 has two keying features 51 and 52 protruding from its outer surface. Features 51 and 52 are located such that when module 50 is inserted into bezel opening 40 and chassis 45 the keying features of the module line up with the keying features of the bezel and chassis.

FIGS. 6*a-c* and 7*a-b* show yet another embodiment of the present invention in which the keying features 61 and 62 of the bezel opening 60 are located towards the lower portion of the bezel opening and similarly keying feature 71 and 72 protruding from module 70 are located accordingly.

Figure 8:
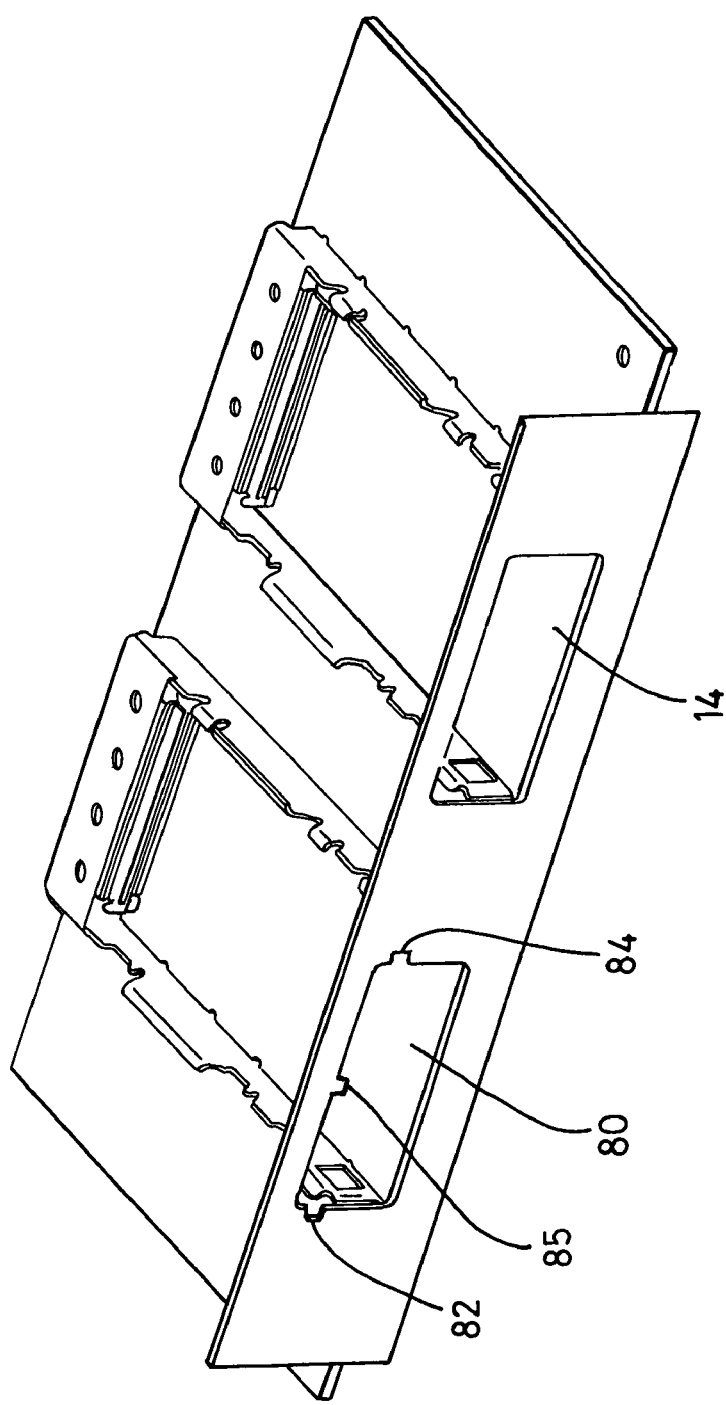
FIGS. 8, 9a-c, and 10 are illustrations of a fourth embodiment of the present invention in which an additional keying feature is present.

Yet a further embodiment is shown in FIG. 8 where an additional keying feature 85 is located in the centre of the top perimeter of bezel opening 80. This is in addition to keying features 82 and 84 located along the sides the bezel opening.

The corresponding designed module is shown in FIGS. 9*a-c* and 10 where a further keying feature 99 is located down the central spine of module 90. Keying feature 99 is in addition to the keying features 96 and 98 located at the front end of module 90. In this embodiment keying features 96 and 98 are protrusion extend outwardly from the side of the module and further keying feature 99 comprises of an indentation or slot located in heat fins 101 located on the top of the module. The location of this indentation or slot may vary depending upon the design or configuration of the module. In use the two forward module keying features 96 and 98 line up with bezel keying features 82 and 84 respectively and module keying feature 99 with bezel keying feature 85 when the module is inserted through bezel opening 80 thus ensuring that both the correct module is inserted into the chassis and that the module is inserted in correct orientation. As a further advantage keying features 96 and 98 help to close any gap between the module and the bezel thus reducing possible leakage of EMI radiation from the front of the chassis.

Figure 9A:
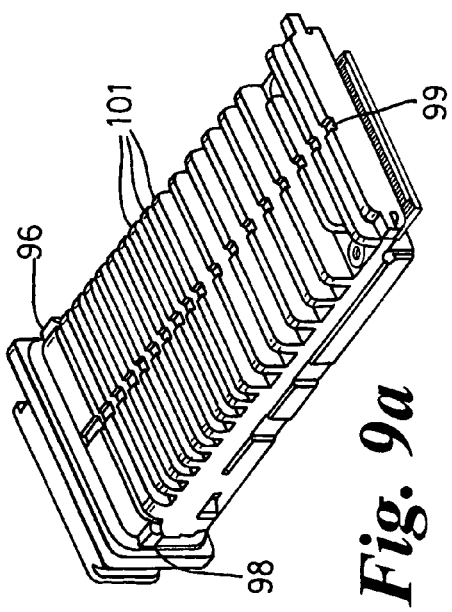
Figure 9B:
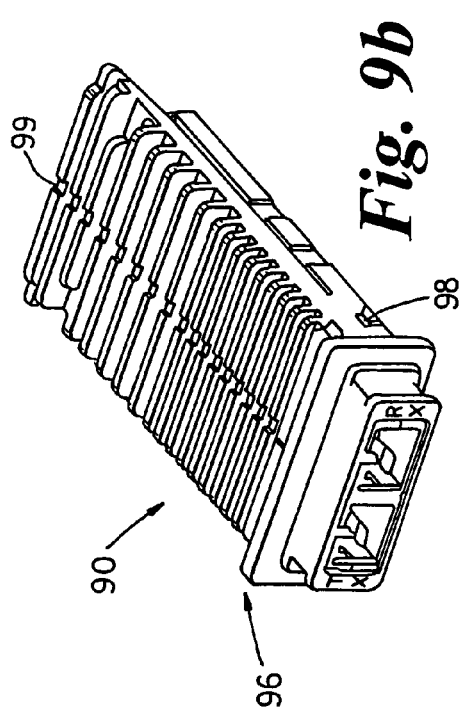
Figure 9C:
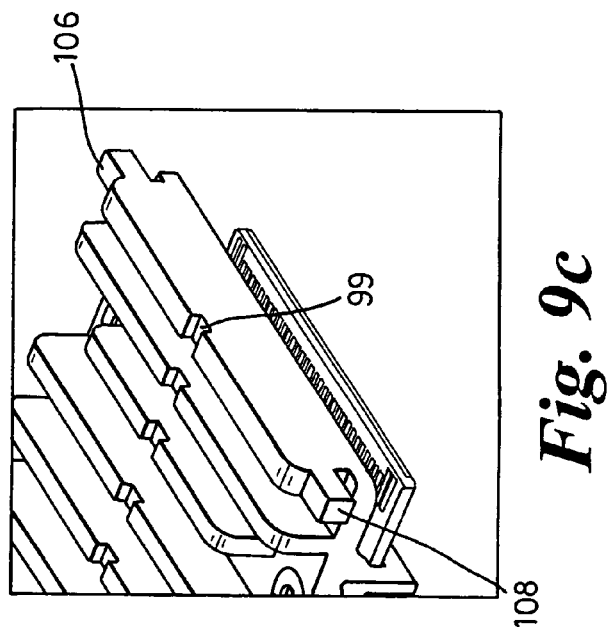
Figure 10:
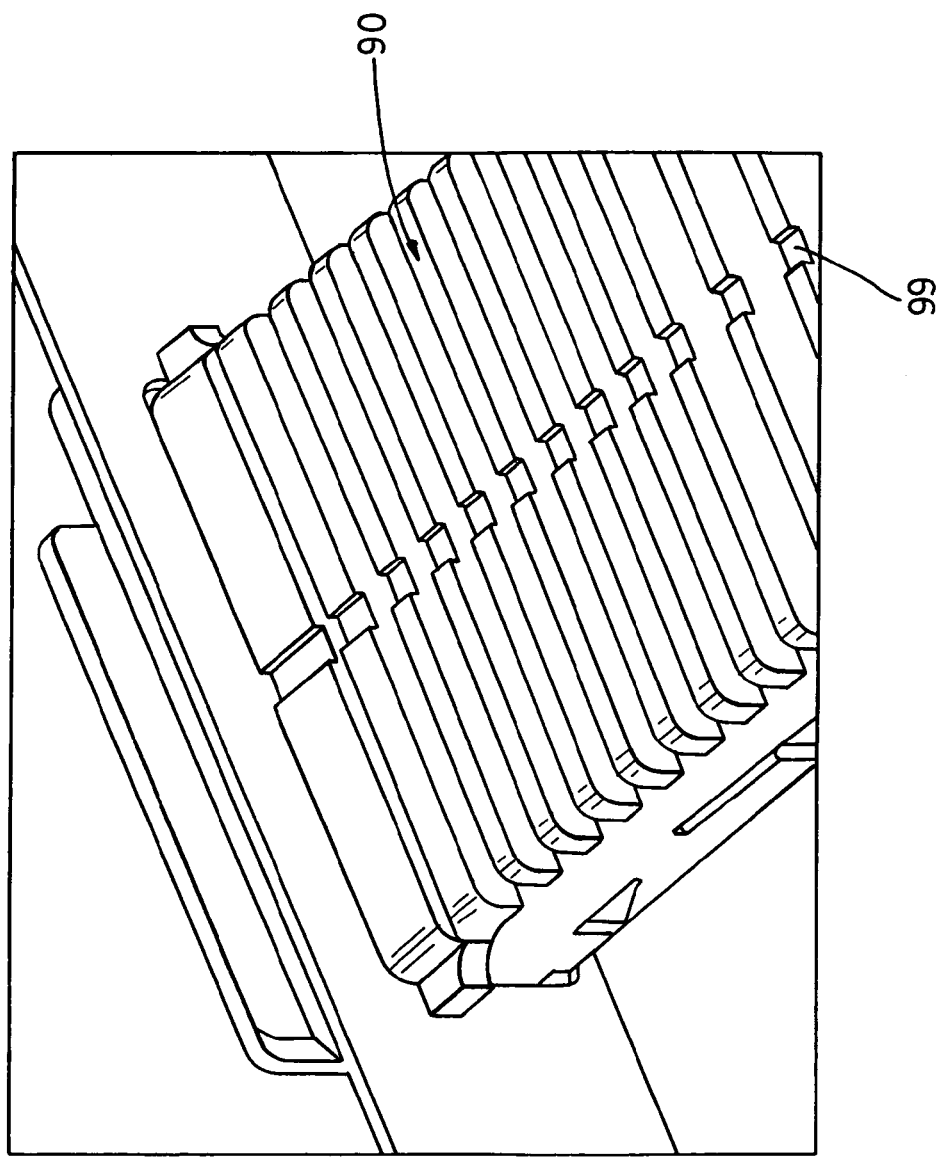

In yet a further embodiment as seen in FIG. 9*c* module 90 may have the additional feature of side protrusions 106 and 108 which are located along the same plane as forward keying features 96 and 98. These features 106 and 108 may function to ensure that the module stays in alignment with electrical connectors located on the chassis as the module is inserted through the bezel opening.

FIGS. 11*a-b* show yet a further embodiment of the present invention in which some alternative bezel opening key configurations are shown. In bezel opening 80, as seen also in FIG. 8, the opening consists of two side keying features 82 and 84 and one central keying feature 85. Here all the keying features are substantially rectangular in shape.

In bezel opening 160 two keying features 162 and 164 are located on the sides of the bezel opening and two further keying features 166 and 168 are located along the top perimeter of the bezel opening. Here all the keying features are substantially triangular in shape.

As will be appreciated the arrangement of the keying features on the bezel opening must conform with the arrangement of the keying features on the outer surface of the module in order for the module to be inserted into the bezel opening and thus into the chassis. The choice of location and shape of the keying features can be decided by the module manufacturer or set as a standard. However, it will be appreciated that in order to ensure that the module is not inserted upside down the arrangement of keying features must be selected such that when the module is turned upside down it cannot be inserted into the bezel opening. For example keyed features comprising two slots located midway along the left and right sides of the bezel opening would still allow for a module to be inserted upside down thus could potentially damaging the module, chassis and system. However, this problem is solved by using keying features of different shapes and the left and rights sides. For example, the keying feature on the left could be rectangular and the keying feature on the right triangular.

Further embodiments of the present invention are envisioned within the scope of the claims.

The invention claimed is:

1. A small form factor pluggable (XFP) optical transceiver module adapted for insertion into a multi-standard compliant chassis and adapted to receive a transmit and a receive connector, the XFP optical transceiver module comprising a housing, said housing being substantially rectangular in shape, wherein at least one keying feature is disposed on an outer surface of said housing and is adapted to engage with a corresponding keying feature on the chassis.

2. A module as claimed in claim 1, wherein said keying feature extends outward from said housing.

3. A module as claimed in claim 1, wherein said keying feature is formed of plastic.

4. A module as claimed in claim 2, wherein said keying feature is rectangular shaped.

5. A module as claimed in claim 1, wherein said keying feature is triangular shaped.

6. A module as claimed in claim 1, wherein a second keying feature is disposed on said outer surface of said housing.

7. A module as claimed in claim 1, wherein a further keying feature is disposed on said outer surface of said module.

8. A module as claimed in claim 7, wherein said further keying feature extends inward from said housing.

9. A module as claimed in claim 8, wherein said further keying feature extends along a longitudinal axis of said housing.

10. A module as claimed in claim 1, wherein said first and second keying features are located proximate a front end of said housing.

11. A module as claimed in claim 1, wherein a third and forth keying features are disposed on said outer surface of said module and located proximate a rear end of said housing and coplanar with said first and second keying features.

12. A multi-standard chassis arranged to receive a small form factor pluggable (XFP) optical transceiver module through an opening in a front plate of said chassis, said opening having at least one keying feature disposed therein adapted to engage with a corresponding keying feature disposed on the XFP optical transceiver module.

13. A chassis as claimed in claim 12, wherein said keying feature is rectangular shaped.

14. A chassis as claimed in claim 12, wherein said keying feature is triangular shaped.

15. A chassis as claimed in claim 12, wherein a second keying feature is disposed therein.

16. A chassis as claimed in claim 12, wherein a further keying feature is disposed therein.

17. A system comprising an optical module and a chassis as claimed in claim 12.

18. A system as claimed in claim 17, wherein said keying features are indicative of the system configuration.

19. A system comprising an optical module and a chassis as claimed in claim 1.

20. A system as claimed in claim 19, wherein said keying features are indicative of the system configuration.

* * * * *